Patented Aug. 8, 1950

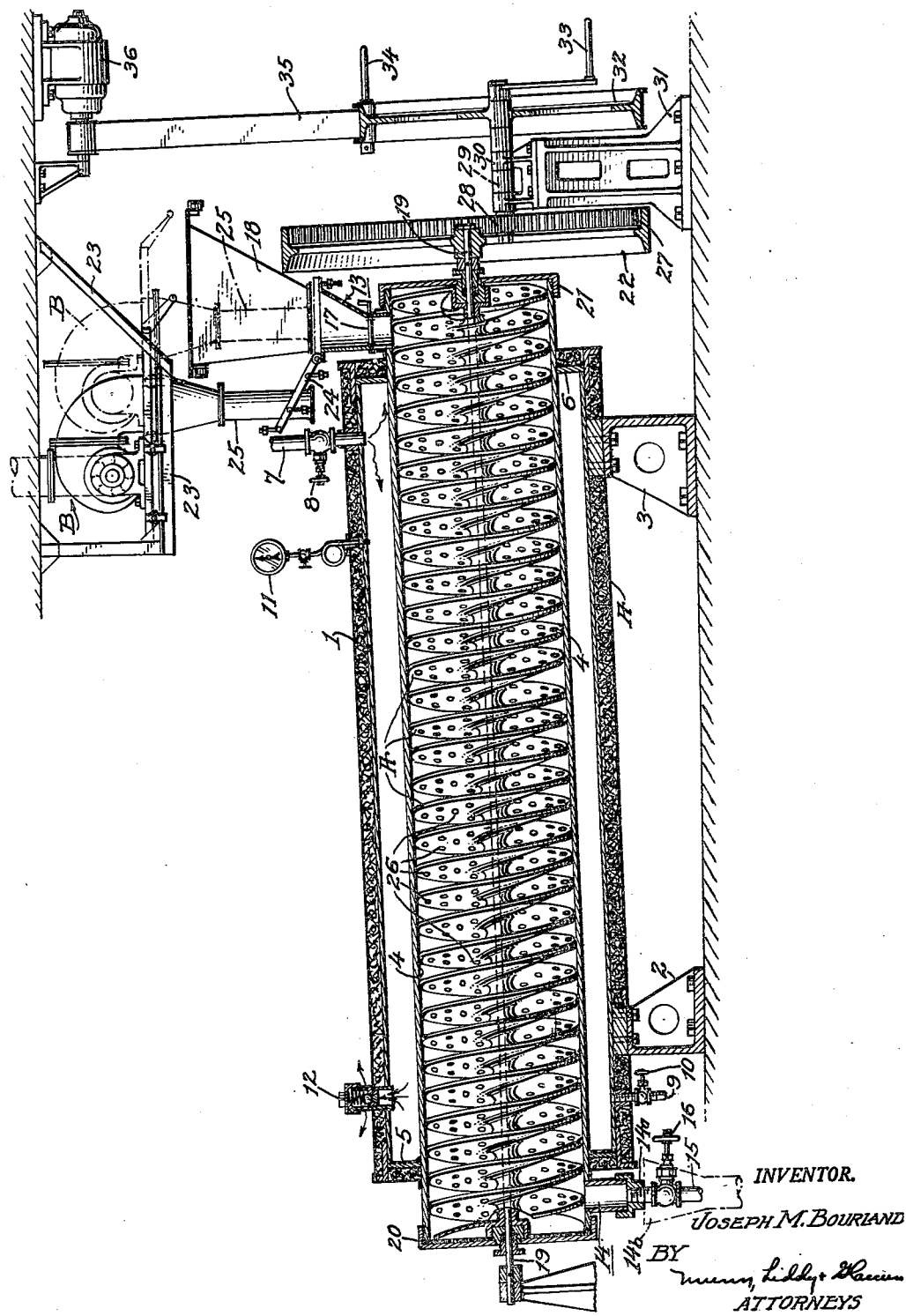

2,517,833

UNITED STATES PATENT OFFICE 2,517,833

CONTINUOUS HIGH-PRESSURE STEAM RETORT AND STERILIZER

Joseph M. Bourland, Richmond, Calif., assignor of one-half to Thomas J. Bourland, Richmond, Calif.

Application November 26, 1946, Serial No. 712,287

2 Claims. (Cl. 21—94)

An object of my invention is to provide a continuous high pressure steam retort and sterilizer especially designed for the purpose of manufacturing humus on a commercial basis that will meet the requirements of the Pure Food and Drug Act, those of the chief chemist of the Agriculture Department, and the various boards of health.

To the best of my knowledge there is no method of composting that will produce humus that can meet the above requirements and still make use of city waste, human excretia, animal matter and diseased vegetable matter in a manner that is absolutely safe in every way to prevent the spread of disease and also eliminate all nuisance. Material that is not safe to be used for composting is made perfectly safe by passing it through the retort and sterilizing it.

By using the steam retort, the humus can be made in much less time and at a saving in expense. The retort can be made of any size and length for the purpose desired.

It is possible to use the steam retort for other purposes such as the commercial making of apple butter, syrups, marmalades, jams and jellies, in large quantities without any danger of scorching.

Other objects and advantages will appear in the following specificaion, and the novel features of the device will be particularly pointed out in the appended claims.

My invention is illustrated in the accompanying drawing, forming a part of this application, in which the figure is a longitudinal section through the steam retort.

While I have shown only the preferred form of my invention, it should be understood that various changes or modifications may be made within the scope of the appended claims without departing from the spirit and scope of the invention.

In carrying out my invention, I provide a steam retort that has an outer cylindrical steam chest 1 mounted on base members 2 and 3, so that the housing will be inclined slightly from the horizontal. Within the housing 1, I mount an inner cylinder 4 and this is supported by end caps 5 and 6 that are secured to and close the ends of the outer steam chest by being welded or otherwise secured thereto. Both of the caps 5 and 6 have central openings for receiving the inner cylinder 4. The structure is such that a steam-tight fit is provided by the caps between the steam chest and inner cylinder so that a steam pressure chest is formed.

The steam chest may have a steam supply pipe 7 communicating therewith and controlled by a valve or throttle 8. A steam outlet pipe 9 leads from the lower end of the steam pressure chest and a blowoff cock or valve 10 controls the flow of steam or water condensed from the steam through the pipe. A steam gage is illustrated at 11 and will indicate the amount of steam pressure within the steam chest. An automatic air vent is indicated at 12 and communicates with the steam space.

Within the inner cylinder 4, I mount a screw conveyor indicated generally at A. The inner cylinder may be of any diameter and length so that the material moved therethrough by the screw conveyor will be sterilized before the material reaches the exit end. An inlet 13 for receiving the material to be sterilized or cooked is shown at the right hand end of the inner cylinder and an outlet nipple 14 is placed at the left-hand end of the cylinder. If it is desired to use the machine for cooking purposes, a smaller pipe 15 may connect with the nipple 14 by means of a screw cap 14a and a valve 16 closes the pipe until the material is cooked. The valve is then opened and controls the flow of material from the machine. The inlet 13 may be provided with a slide valve 17 for controlling the size of the entrance opening. A removable hopper 18 may be used for delivering material to inlet 13.

The screw conveyor A may be of any desired pitch and it is designed to fill the inner cylinder 4 and to extend from end to end. The screw conveyor is mounted on a shaft 19 that is journaled in end caps 20 and 21 provided for the inner cylinder. A large flywheel 22 is mounted on the shaft 19. The mechanism for rotating the screw will be described hereinafter.

A steam pressure of about two hundred pounds or more to the square inch is provided in the steam chest and the temperature of the steam may vary from around 5° F. to 600° F. As already stated, the steam retort is designed especially for sterilizing some of the material that goes into the humus so as to kill any disease germs, weed seeds and the like. The material to be sterilized is moistened and fed into the hopper 18 at a rate which will permit the screw conveyor to move the material from the entrance to the exit end of the inner cylinder without clogging and at a speed which will insure complete sterilization. During this movement the heat generated by the steam temperature in the steam chest will raise the temperature of the material to a sterilizing heat. Therefore, the material passing out through the outlet nipple 14 and into a receiving funnel 14b will be sterile and can be handled without danger.

In certain instances it may be desirable to force air through the inner cylinder for quick drying purposes. In this event a blower or fan B mounted on a track 23 is moved to connect with the inlet 13 and the hopper 18 is removed. A hinged cover 24 is swung over the inlet 13 and has an opening receiving the fan discharge pipe 25, so that air at the desired temperature may be forced through the length of the inner cylinder. The screw conveyor spiral blade will have perforations 26 to permit the air to pass therethrough. The cap 14a is removed and the air will escape from the nipple 14.

The means for rotating the flywheel comprises an internal ring gear 27 for the flywheel that is in mesh with a pinion 28. The pinion 28 is mounted on a shaft 29 which in turn is rotatably mounted in bearings 30 and supported by a standard 31. A pulley 32 is mounted on the shaft 29 and a crank handle 33 is used for manually rotating the pulley. It is possible to connect the handle directly to the shaft 29 as shown. A turning of the handle 33 will rotate the pulley and the shaft 29, causing the pinion 28 to rotate the flywheel 22 and the shaft 19 of the screw conveyor. A second handle 34 removably secured to the rim of the pulley 32 may be used if a greater leverage is wanted for manually rotating the screw conveyor.

A belt 35 may be mounted on the pulley 32 for connection to a source of power, such as a motor 36 for rotating the conveyor or auger.

The openings 26 in the conveyor blade aid in agitating the material being sterilized because some of the finer material will pass through the openings, although all will be forced from the cylinder eventually. When cooking apple butter and the like, the conveyor may be rotated a few revolutions each way for agitating the material and the openings in the conveyor will permit the material to flow therethrough to simulate a stirring action.

I claim:

1. In a sterilizer, a housing having a material-receiving inlet and an outlet for the material, a screw conveyor for advancing the material from the inlet to the outlet in the housing and contacting the housing wall, means for heating the housing for sterilizing the material passing therethrough, said screw conveyor having a screw blade with small perforations therein, and air-delivery means arranged to force a stream of air into the inlet and through the perforations to the outlet for aiding in drying the material being moved by the conveyor.

2. In a sterilizer, a housing having a material receiving inlet and an outlet, a screw conveyer for advancing the material from the inlet to the outlet, means for heating the housing for sterilizing the material passing therethrough, said screw conveyer having a helical blade with perforations therein, and air-delivery means arranged to force a stream of air into the inlet and through the perforations to the outlet for aiding in drying the material being moved by the conveyor, said means including a cover swingable over the inlet and having an opening, and an air conveying pipe communicating with the cover opening.

JOSEPH M. BOURLAND.

REFERENCES CITED

The following references are of record in the file of this patent:

UNITED STATES PATENTS

| Number | Name | Date |
|---|---|---|
| Re. 20,987 | Routh | Jan. 24, 1939 |
| 395,580 | Parkison et al. | Jan. 1, 1889 |
| 1,052,845 | Ponndorf | Feb. 11, 1913 |
| 1,075,550 | Cretors | Oct. 14, 1913 |
| 1,229,236 | Cross | June 12, 1917 |
| 1,478,734 | Crompton | Dec. 23, 1933 |
| 2,038,313 | Placko | Apr. 21, 1936 |
| 2,263,794 | Wyen | Nov. 25, 1941 |